US011382017B2

(12) United States Patent
Verger et al.

(10) Patent No.: US 11,382,017 B2
(45) Date of Patent: Jul. 5, 2022

(54) INTER-DEVICE COMMUNICATION SESSION CONTINUITY FACILITATED BY A WIRELESS AUDIO OUTPUT DEVICE

(71) Applicant: Apple Inc., Cupertino, CA (US)

(72) Inventors: Luciano M. Verger, San Jose, CA (US); Ajoy K. Singh, Milpitas, CA (US); Albert R. Howard, Jr., Sunnyvale, CA (US); Ariane Cotte, San Francisco, CA (US); Christopher M. Garrido, San Jose, CA (US); Faraz Faheem, Santa Clara, CA (US); Gregory R. Burns, San Francisco, CA (US); Ian J. Baird, San Jose, CA (US); Imran Ahmed, Fremont, CA (US); Nicholas J. Circosta, Mountain View, CA (US); Robert D. Watson, Menlo Park, CA (US); Rohan C. Malthankar, San Jose, CA (US); Ryan A. Williams, Sunnyvale, CA (US); Sergey Sitnikov, San Jose, CA (US); Srinivasan Nimmala, San Jose, CA (US); Thomas Chathoth Abraham, San Francisco, CA (US); Vikram B. Yerrabommanahalli, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 119 days.

(21) Appl. No.: 16/862,415

(22) Filed: Apr. 29, 2020

(65) Prior Publication Data
US 2020/0351747 A1    Nov. 5, 2020

Related U.S. Application Data

(60) Provisional application No. 62/843,251, filed on May 3, 2019.

(51) Int. Cl.
*H04W 36/30* (2009.01)
*H04W 76/15* (2018.01)
(Continued)

(52) U.S. Cl.
CPC .......... *H04W 36/30* (2013.01); *H04W 36/28* (2013.01); *H04W 36/36* (2013.01); *H04W 76/15* (2018.02); *H04W 76/22* (2018.02)

(58) Field of Classification Search
CPC ..... H04W 76/15; H04W 36/28; H04W 36/30; H04W 36/36; H04W 36/0011;
(Continued)

(56) References Cited

U.S. PATENT DOCUMENTS

2010/0304674 A1\* 12/2010 Kim .................. H04W 76/10 455/41.2
2014/0204834 A1\* 7/2014 Singh .................. H04W 40/22 370/315

(Continued)

*Primary Examiner* — Magdi Elhag
(74) *Attorney, Agent, or Firm* — BakerHostetler

(57) ABSTRACT

A device providing inter-device call continuity facilitated by a wireless audio output device may include a processor configured to initiate, over a peer-to-peer connection with a second device, a communication session between the second device and a third device. The processor may be further configured to establish, over the peer-to-peer connection with the second device, an audio link corresponding to the communication session. The processor may be further configured to determine, based at least in part on the audio link, that a connection quality of the peer-to-peer connection satisfies a connection degradation condition. The processor may be further configured to request, over a wide area network connection, for the communication session with the third device to be handed-off from the second device to the first device, and to establish, over the wide area network connection, the communication session with the third device.

20 Claims, 8 Drawing Sheets

(51) Int. Cl.
*H04W 36/28* (2009.01)
*H04W 36/36* (2009.01)
*H04W 76/22* (2018.01)

(58) Field of Classification Search
CPC ..... H04W 36/03; H04W 24/02; H04W 76/14; H04W 76/22; H04W 76/23; H04W 84/18; H04W 88/04; H04W 40/22; H04W 4/80; H04W 40/12; H04W 4/70
See application file for complete search history.

(56) References Cited

U.S. PATENT DOCUMENTS

| | | | |
|---|---|---|---|
| 2018/0192396 A1* | 7/2018 | Fu | H04W 4/80 |
| 2019/0141137 A1* | 5/2019 | Verger | H04W 76/23 |
| 2019/0173934 A1* | 6/2019 | Beattie, Jr | H04N 7/147 |
| 2019/0320361 A1* | 10/2019 | Uchiyama | H04W 36/03 |

* cited by examiner

```
                                    600

602  ┌─────────────────────────────────────────────┐
              │ REQUEST, BY A FIRST ELECTRONIC DEVICE, TO   │
              │ TRANSFER A COMMUNICATION SESSION FROM A     │
              │ SECOND ELECTRONIC DEVICE TO THE FIRST       │
              │ ELECTRONIC DEVICE, THE COMMUNICATION SESSION│
              │ BEING WITH A THIRD ELECTRONIC DEVICE        │
              └─────────────────────────────────────────────┘
                                    │
                                    ▼
         604  ┌─────────────────────────────────────────────┐
              │ DETERMINE THAT AN AUDIO STREAM FOR THE      │
              │ COMMUNICATION SESSION IS BEING              │
              │ FORWARDED FROM THE SECOND ELECTRONIC        │
              │ DEVICE TO A WIRELESS AUDIO OUTPUT DEVICE    │
              └─────────────────────────────────────────────┘
                                    │
                                    ▼
         606  ┌─────────────────────────────────────────────┐
              │ ESTABLISH, BY THE FIRST ELECTRONIC DEVICE, THE│
              │ COMMUNICATION SESSION WITH THE THIRD        │
              │ ELECTRONIC DEVICE                           │
              └─────────────────────────────────────────────┘
                                    │
                                    ▼
         608  ┌─────────────────────────────────────────────┐
              │ CONNECT, BY THE FIRST ELECTRONIC DEVICE, TO THE│
              │ WIRELESS AUDIO OUTPUT DEVICE OVER A PEER-TO-PEER│
              │ CONNECTION                                  │
              └─────────────────────────────────────────────┘
                                    │
                                    ▼
         610  ┌─────────────────────────────────────────────┐
              │ FORWARD, BY THE FIRST ELECTRONIC DEVICE, THE AUDIO│
              │ STREAM FOR THE COMMUNICATION SESSION TO THE WIRELESS│
              │ AUDIO OUTPUT DEVICE VIA THE PEER-TO-PEER CONNECTION│
              └─────────────────────────────────────────────┘
```

*FIG. 6*

INTER-DEVICE COMMUNICATION SESSION CONTINUITY FACILITATED BY A WIRELESS AUDIO OUTPUT DEVICE

CROSS REFERENCE TO RELATED APPLICATIONS

This application claims the benefit of priority to U.S. Provisional Patent Application No. 62/843,251, entitled "Inter-Device Communication Session Continuity Facilitated by a Wireless Audio Output Device," and filed on May 3, 2019, the disclosure of which is hereby incorporated herein in its entirety.

TECHNICAL FIELD

The present description relates generally to inter-device communication session continuity, including inter-device communication session continuity facilitated by a wireless audio output device.

BACKGROUND

A user may initiate a communication session on a first electronic device, such as their work computer or mobile phone, and may wish to continue the communication session on a second electronic device, such as their mobile phone or watch.

BRIEF DESCRIPTION OF THE DRAWINGS

Certain features of the subject technology are set forth in the appended claims. However, for purpose of explanation, several embodiments of the subject technology are set forth in the following figures.

FIG. 6 illustrates a flow diagram of an example process of an electronic device performing inter-device communication session continuity including wireless audio output device continuity in accordance with one or more implementations.

DETAILED DESCRIPTION

Figure 1:
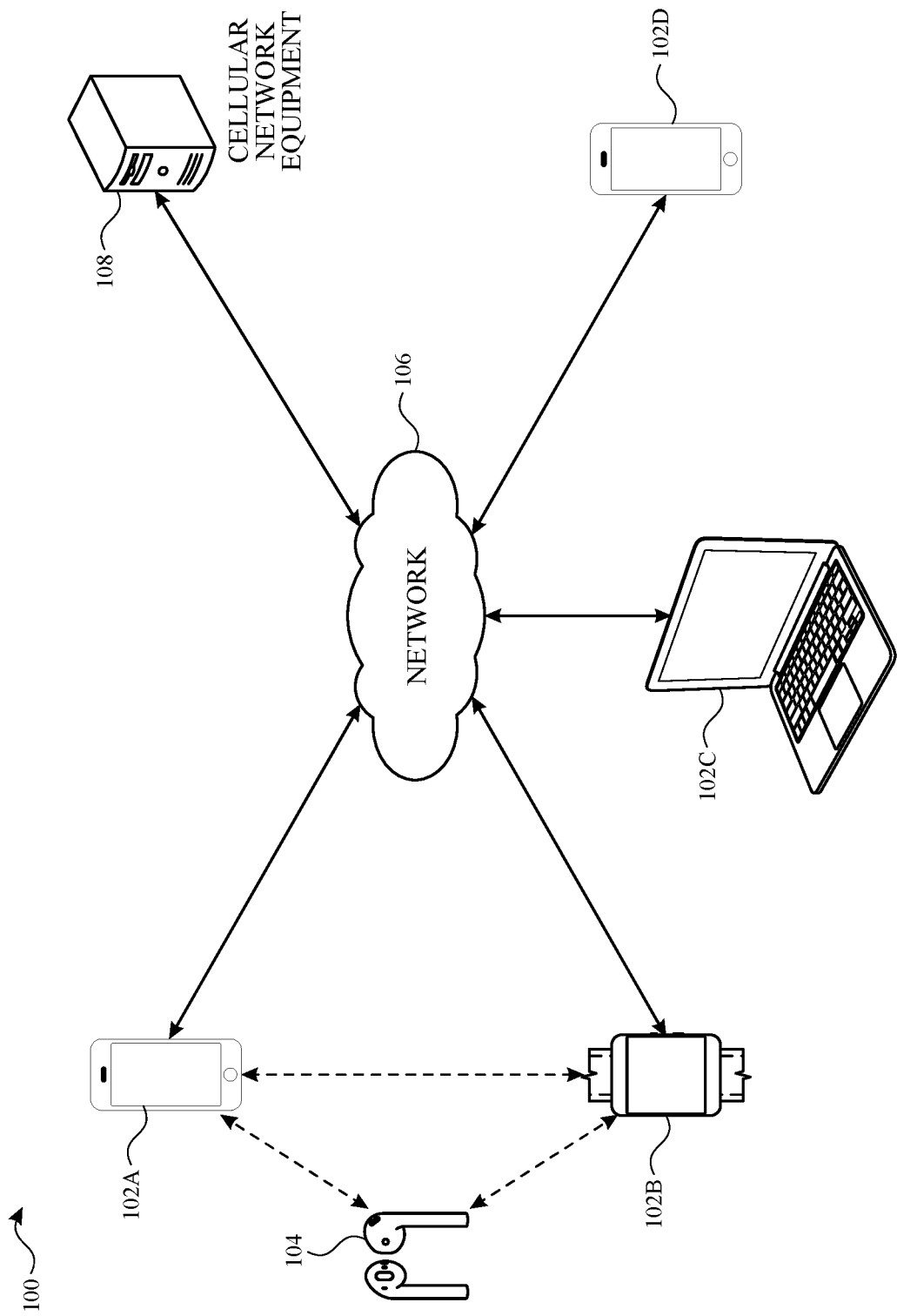
FIG. 1 illustrates an example network environment for inter-device communication session continuity facilitated by a wireless audio output device in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Cellular devices with low-power footprints, such as watches and/or other wearable devices, may utilize proximate devices, such as mobile phones, to relay wireless communication sessions, such as phone calls, video calls, and the like. For example, a watch with cellular capability may be connected via a peer-to-peer connection, e.g., a Bluetooth connection, with a proximate mobile phone. When a communication session, such as a cellular call, is initiated on the watch, the watch may request, over the peer-to-peer connection, that the communication session be established by the mobile phone and relayed to the watch over the peer-to-peer connection. The watch and mobile phone may establish an audio link over the peer-to-peer connection, and audio for the communication session may be relayed between the mobile phone and watch over the audio link. In some implementations, the audio may be organized as one or more audio streams. In some implementations, the audio may be organized as one or more packets, messages, etc. In this manner, the watch is able to conserve battery life by utilizing the mobile phone's cellular circuitry for the communication session.

If the watch subsequently moves out of the range of the peer-to-peer connection with the mobile phone, the watch may automatically request, e.g. via cellular network equipment such as an IP Multimedia Subsystem (IMS) server, that the cellular network equipment hand-off the communication session from the mobile phone to the watch. However, the conservation of the battery life of the watch may be improved or maximized by utilizing the cellular circuitry of the mobile phone for as long as possible. Thus, the watch may rely on a monitored quality of the audio link between the watch and the mobile phone to determine when to request that the communication session be handed off to the watch.

In one or more implementations, a wireless audio output device, such as a wireless headset, may be selected as the audio output device for the watch. Thus, when the watch requests that a communication session be established by the mobile phone, the mobile phone may establish the communication session and may also establish an audio link directly with the wireless audio output device, e.g., to avoid the need to relay audio through the watch. In this instance, since the watch cannot determine the quality of the audio link, the wireless audio output device may measure wireless link and audio quality, and may signal the watch when the watch should request that the communication session be handed off to the watch. This may also avoid degraded audio performance at the audio output device where the connection between the watch and the mobile phone has better performance (e.g., is more robust) than the connection between the audio output device and the mobile phone. After receiving the communication session, the watch may establish an audio link with the wireless audio output device such that the call can be seamlessly continued via the wireless audio output device.

In one or more implementations, the communication session may have been initiated by the mobile phone (e.g., not by the watch) with the audio link for the communication session being established between the phone and the wireless audio output device. The wireless audio output device may periodically broadcast one or more packets that indicate the status/state of the wireless audio output device, such as to indicate that the wireless audio output device is being utilized by the mobile phone for the communication session. If the communication session is subsequently handed off from the mobile phone to another proximate device, such as the watch or a laptop computer, the proximate device may determine, based on the one or more packets broadcast by the wireless audio output device, that the wireless audio output device is being utilized for the communication session. The proximate device may automatically establish an audio link for the communication session with the wireless audio output device, e.g., upon receiving the communication session. In this manner, the wireless audio output device can be locally handed-off from the mobile phone to the proximate device in conjunction with the remote hand-off by the cellular network equipment of the communication session from the mobile phone to the proximate device.

FIG. 1 illustrates an example network environment 100 for inter-device communication session continuity facilitated by a wireless audio output device in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-D, a wireless audio output device 104, a network 106, and cellular network equipment 108. The cellular network equipment 108 may include any of, for example, one or more access networks, a core network, application servers, media servers, base stations, IP multimedia subsystem (IMS) servers, and the like. The cellular network equipment 108 may be physically or logically associated with a particular cellular carrier, and/or the cellular network equipment may span multiple different cellular carriers. The network 106 may communicatively (directly or indirectly) couple, for example, any two or more of the electronic devices 102A-D and/or the cellular network equipment 108. In FIG. 1, the wireless audio output device 104 is illustrated as not being directly coupled to the network 106; however, in one or more implementations, the wireless audio output device 104 may be directly coupled to the network 106.

The network 106 may be an interconnected network of devices that may include, or may be communicatively coupled to, the Internet. In one or more implementations, the network 106 may include all or part of the cellular network equipment 108. In one or more implementations, connections over the network 106, and/or connections utilizing the cellular network equipment 108, may be referred to as wide area network connections, while connections between two or more of the electronic devices 102A-C and/or with the wireless audio output device 104, may be referred to as peer-to-peer connections.

One or more of the electronic devices 102A-D may be, for example, a portable computing device such as a laptop computer, a smartphone, a peripheral device (e.g., a digital camera, headphones), a tablet device, a wearable device such as a watch, a band, and the like, or any other appropriate device that includes one or more wireless interfaces, such as one or more near-field communication (NFC) radios, WLAN radios, Bluetooth radios, Zigbee radios, cellular radios, and/or other wireless radios. In FIG. 1, by way of example, the electronic devices 102A,D are depicted as mobile phones, the electronic device 102B is depicted as a watch, and the electronic device 102C is depicted as a laptop computer. One or more of the electronic devices 102A-C may be, and/or may include all or part of, the electronic device discussed below with respect to FIG. 2, and/or the electronic system discussed below with respect to FIG. 8.

The wireless audio output device 104 may be, for example, a wireless headset device, one or more wireless earbuds, a smart speaker, or generally any device that includes audio output circuitry and one or more wireless interfaces, such as near-field communication (NFC) radios, WLAN radios, Bluetooth radios, Zigbee radios, and/or other wireless radios. In FIG. 1, by way of example, the wireless audio output device 104 is depicted as a set of wireless earbuds. The wireless audio output device 104 may be, and/or may include all or part of, the wireless audio output device discussed below with respect to FIG. 2, and/or the electronic system discussed below with respect to FIG. 8.

The wireless audio output device 104 may be paired, such as via Bluetooth, with one or more of the electronic devices 102A-D. Two or more of the electronic devices 102A-D, such as the electronic devices 102A-B may also be paired together. After two of the devices 102A-D, 104 are paired together, the devices may automatically form a peer-to-peer connection when located proximate to one another, such as within Bluetooth communication range of one another. In one or more implementations, the wireless audio output device 104 may be configured to maintain separate peer-to-peer connections with two or more of the electronic devices 102A-D, such as the electronic devices 102A-B. However, in one or more implementations, one or more of the devices 102A-D, 104, may only support a particular number of simultaneous peer-to-peer connections, and/or may only support multiple peer-to-peer connections with specific devices. An example peer-to-peer network environment that includes a paired electronic device 102A and wireless audio output device 104 is discussed further below with respect to FIG. 2.

In one or more implementations, one or more of the electronic devices 102A-D, such as the electronic devices 102A-C and/or the wireless audio output device 104 may be associated with and/or registered to a same (common) user account for a service provider. The service provider may utilize one or more servers of the cellular network equipment 108, such as one or more IMS servers, to allow incoming communication sessions, such as incoming phone calls, to be routed to one or more of the electronic devices 102A-C registered to the same user account. Once the phone call is answered on one of the electronic devices 102A-C, such as the electronic device 102C, one or more servers of the cellular network equipment 108, such as the one or more IMS servers, may allow the phone call to be handed-off from the electronic device 102C to one or more of the electronic devices 102A-C, such as the electronic device 102A.

If the electronic device 102C is utilizing the wireless audio output device 104 for the phone call, the wireless audio output device 104 may be automatically connected to the electronic device 102A when the hand-off occurs. For example, the wireless audio output device 104 may transmit one or more broadcast packets that indicate a current status/state of the wireless audio output device 104, such as to indicate that the wireless audio output device 104 is being utilized by the electronic device 102C for a particular communication session. In some implementations, the broadcast packets may be securely transmitted such that they are accessible to devices that have previously paired with, and/or exchanged keys with, the wireless audio output device 104. Thus, the electronic device 102A may receive one or more of the broadcast packets and then determine to connect to the wireless audio output device, e.g., close in time to when the hand-off of the communication session occurs, as is discussed further below, e.g., with respect to FIGS. 3 and 6.

In one or more implementations, one or more of the electronic devices 102A-D, such as the electronic device 102B may have a limited power supply, and/or battery capacity, e.g., relative to one or more of the other electronic devices 102A,C,D, such as the electronic device 102A. Thus, in order to conserve power, the electronic device 102B may utilize a peer-to-peer connection with the electronic device 102A to initiate a communication session with another electronic device, such as the electronic device 102D, via the cellular circuitry of the electronic device 102A. The electronic devices 102A-B may establish an audio link over the peer-to-peer connection, e.g., using a lower power communications interface than a cellular interface, to relay the one or more audio streams for the communication session between the electronic devices 102A-B. However, the electronic device 102B may maintain the appearance, e.g. via a user interface and/or functions, that its own cellular circuitry is being utilized for the communication session.

When the electronic device 102B moves out of range of the peer-to-peer connection with respect to the electronic device 102A, the electronic device 102B automatically requests that the cellular network equipment 108 hand-off, or re-route, the communication session from the electronic device 102A to the electronic device 102B. In some implementations, the electronic device 102B may monitor the quality of the audio link to determine when to request the hand-off, as is discussed further below with respect to FIG. 5.

In one or more implementations, the wireless audio output device 104 may be selected as the audio output device for the electronic device 102B. Thus, when the electronic device 102B initiates a communication session via the cellular circuitry of the electronic device 102A, the electronic device 102A may establish an audio link for the communication session with the wireless audio output device 104. Since in this instance the electronic device 102B cannot monitor the quality of the audio link, the wireless audio output device 104 may monitor the quality of the audio link and may transmit a message, e.g., to the electronic device 102B, to indicate when the hand-off should be requested or initiated, e.g., as is discussed further below with respect to FIGS. 4 and 7.

In one or more implementations, one or more of the electronic devices 102A-D, such as the electronic device 102C, may not include cellular circuitry (or a cellular interface) for communicating with the cellular network equipment 108, such as the IMS servers. In this instance, the electronic device 102C may utilize WiFi calling to register for services, such as IMS services, via the cellular network equipment 108, so that the electronic device 102C is directly reachable by the cellular network equipment 108 for call routing.

For explanatory purposes, a communication session is primarily described herein as being a cellular communication session, e.g. a cellular phone call. However, a communication session may be, for example, a video call, a Wi-Fi call, a VoIP call, an intercom call, a push-to-talk (PTT) call, a D2D call, or generally any communication between two or more of the electronic devices 102A-D.

Figure 2:
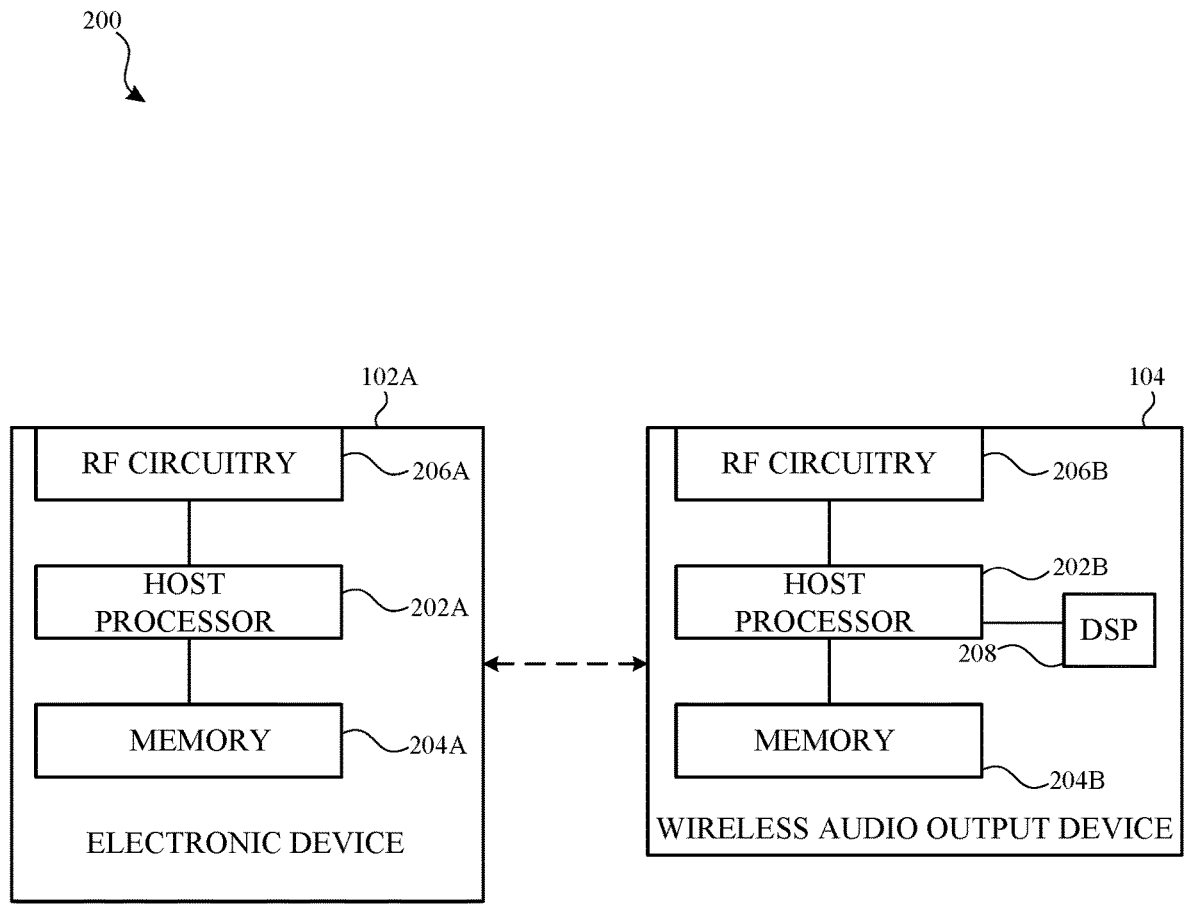
FIG. 2 illustrates an example peer-to-peer network environment including an example electronic device and an example wireless audio output device in accordance with one or more implementations.

FIG. 2 illustrates an example peer-to-peer network environment 200 including an example electronic device 102A and an example wireless audio output device 104 in accordance with one or more implementations. The electronic device 102A is depicted in FIG. 2 for explanatory purposes; however, one or more of the components of the electronic device 102A may also be implemented by one or more of the other electronic devices 102B-D. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102A may include a host processor 202A, a memory 204A, and radio frequency (RF) circuitry 206A. The wireless audio output device may include a host processor 202B, a memory 204A, RF circuitry 206B, and a digital signal processor (DSP) 208.

The RF circuitry 206A,B may include one or more antennas and one or more transceivers for transmitting/receiving RF communications, such as WiFi, Bluetooth, cellular, and the like. In one or more implementations, the RF circuitry 206A of the electronic device 102A may include circuitry for forming wide area network connections and peer-to-peer connections, such as WiFi, Bluetooth, and/or cellular circuitry, while the RF circuitry 206B of the wireless audio output device 104 may only include Bluetooth, WiFi, and/or other circuitry for forming peer-to-peer connections. However, in one or more implementations, the RF circuitry 206B of the wireless audio output device 104 may also include circuitry for forming wide area network connections, such as cellular circuitry.

The host processors 202A-B may include suitable logic, circuitry, and/or code that enable processing data and/or controlling operations of the electronic device 102A and the wireless audio output device 104, respectively. In this regard, the host processors 202A-B may be enabled to provide control signals to various other components of the electronic device 102A and the wireless audio output device 104, respectively. Additionally, the host processors 202A-B may enable implementation of an operating system or otherwise execute code to manage operations of the electronic device 102A and the wireless audio output device 104, respectively. The memories 204A-B may include suitable logic, circuitry, and/or code that enable storage of various types of information such as received data, generated data, code, and/or configuration information. The memories 204A-B may include, for example, random access memory (RAM), read-only memory (ROM), flash, and/or magnetic storage.

The DSP 208 of the wireless audio output device 104 may include suitable logic, circuitry, and/or code that enable particular processing, such as measuring a quality of an audio link between the RF circuitry 206B and the RF circuitry 206A. Any factor or combination of factors can be used to determine quality. For example, an RF controller, such as a Bluetooth controller may send a received signal strength indicator (RSSI) for a given audio link of a peer-to-peer connection between the RF circuitries 206A-B together with audio packets for the audio link to the DSP 208. The DSP 208 may measure or otherwise determine a quality of the audio link, for example, by measuring the audio loss percentage, stalls, and/or retransmission requests corresponding to the audio packets. The host processor 202B may utilize an algorithm based on, for example, the RSSI and the audio loss measured by the DSP 208 to determine when the audio link indicates that a connection quality of the peer-to-peer connection satisfies a connection degradation condition. The host processor 202A of the electronic device 102A may implement a similar algorithm to determine when a particular audio link of a peer-to-peer connection with another electronic device indicates that a connection quality of the peer-to-peer connection satisfies a connection degradation condition.

In one or more implementations, one or more of the host processors 202A-B, the DSP 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
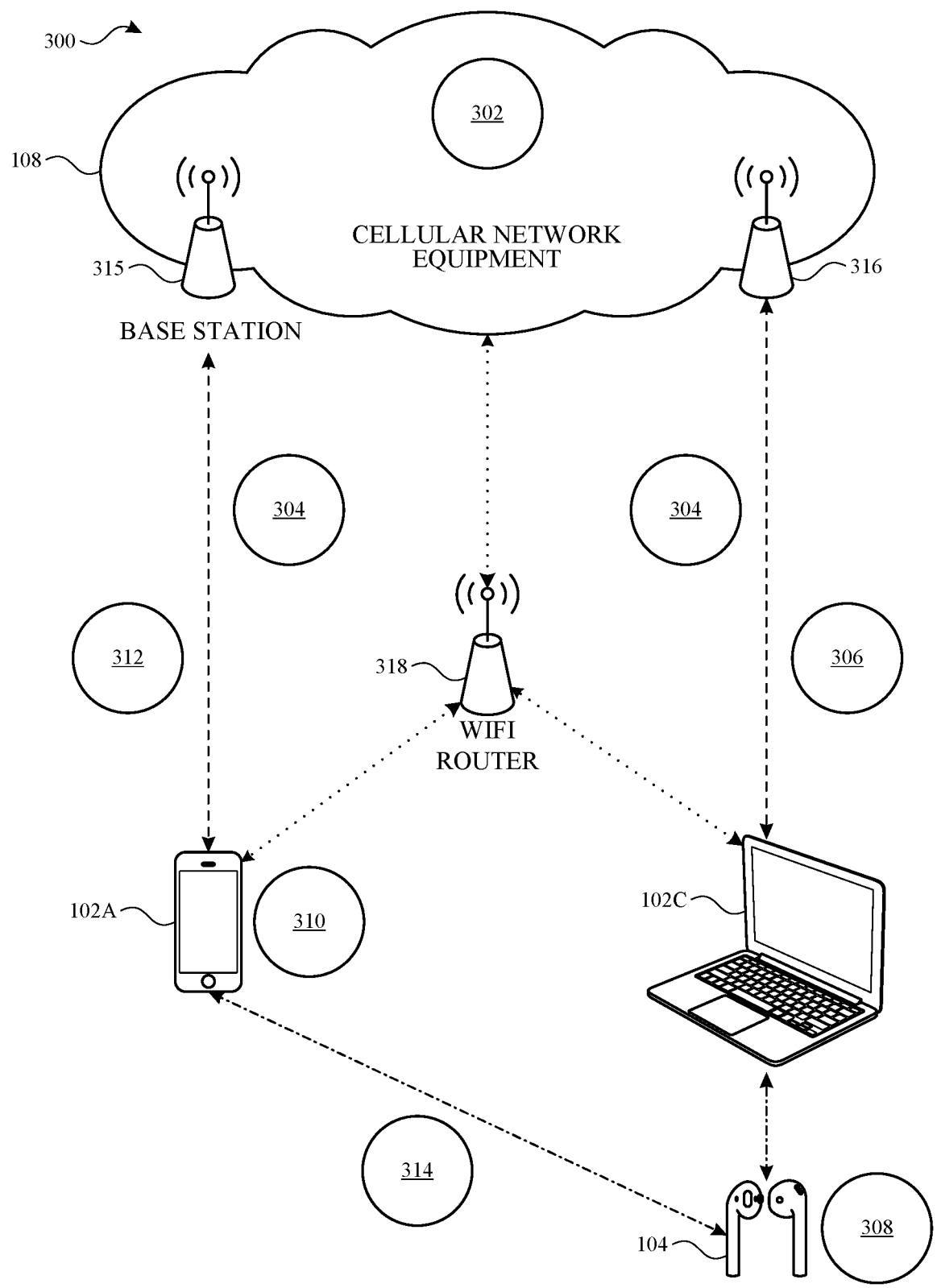
FIG. 3 illustrates an example system flow for inter-device communication session continuity in accordance with one or more implementations.

FIG. 3 illustrates an example system flow 300 for inter-device communication session continuity in accordance with one or more implementations. For explanatory purposes, the system flow 300 is primarily described herein with reference to the electronic devices 102A,C and the wireless audio output device 104 of FIG. 1. However, the electronic devices 102A,C and the wireless audio output device 104 are presented as exemplary devices and the operations described herein may be performed by any suitable devices. Further for explanatory purposes, the operations of the system flow 300 are described herein as occurring in serial, or linearly. However, multiple operations of the system flow 300 may occur in parallel. In addition, the operations of the system flow 300 need not be performed in the order shown and/or one or more of the operations of the system flow 300 need not be performed and/or can be replaced by other operations.

The system flow 300 begins with the electronic devices 102A,C registering with the cellular network equipment 108, such as cellular network equipment 108 associated with a particular cellular carrier (302). For example, the electronic device 102C, which is depicted in FIG. 3 as a laptop computer, may register with the cellular network equipment 108 by utilizing WiFi calling to connect to the network device 316, such as via a wide area network link (not shown), while the electronic device 102A, which is depicted in FIG. 3 as a mobile phone, registers with the cellular network equipment 108 via the base station 315 (e.g., a cellular base station). In one or more implementations, the electronic devices 102A,C and/or the wireless audio output device 104, may be associated with a same user account, and/or the electronic devices 102A,C may each have been previously paired with the wireless audio output device 104.

When an incoming call is received by the cellular network equipment, such as from the electronic device 102D (not shown), the call is forwarded to all of the electronic devices 102A,C registered with the cellular network equipment 108 and/or all of the electronic devices 102A,C registered to the corresponding user account (304). In the system flow 300, the call is answered by the electronic device 102C and the received audio for the call is transmitted from the cellular network equipment 108 to the electronic device 102C, such as via an interworking wireless local area network (IWLAN) tunnel (306).

If the wireless audio output device 104 is selected as the audio output device for the electronic device 102C, the electronic device 102C may establish an audio link with the wireless audio output device 104, and may transmit the received audio stream for the call to the wireless audio output device 104 via the audio link (308). The wireless audio output device 104 may periodically broadcast one or more packets that indicate the current status/state of the wireless audio output device 104. For example, during the call the wireless audio output device 104 may broadcast packets that indicate that the wireless audio output device 104 is being utilized for a call being conducted via the electronic device 102C.

During the call, the electronic device 102A may display a user interface that allows a user to request that the cellular network equipment 108 hand-off, or re-route, an endpoint of the call from the electronic device 102C to the electronic device 102A (310). In one or more implementations, one or more of the electronic devices 102A-D may automatically request a hand-off of a particular call without user input, as is discussed further below with respect to FIGS. 4, 5, and 7.

In response to a user request to hand-off the call to the electronic device 102A, the electronic device 102A transmits a call transfer request to the cellular network equipment 108, and the cellular network equipment 108 re-routes an endpoint for the call from the electronic device 102C to the electronic device 102A (312). Since the electronic device 102C is utilizing the wireless audio output device 104 for the call, the electronic device 102A may have received broadcast packets from the wireless audio output device 104 indicating that the wireless audio output device is being utilized for the call. In this instance, when the call is re-routed to the electronic device 102A, the electronic device 102A establishes an audio link with the wireless audio output device 104, and transmits the audio for the call to the wireless audio output device 104 (314), such that the call hand-off is performed seamlessly and the audio stream is uninterrupted.

In one or more implementations, the wireless audio output device 104 may only support a single audio link and/or peer-to-peer connection at any given time. In such instances, the electronic device 102A may request, e.g. via the electronic device 102C and/or the wireless audio output device 104, that the audio link between the electronic device 102C and the wireless audio output device 104 be terminated before, or in conjunction with, establishing the audio link with the wireless audio output device 104.

In one or more implementations, the electronic device 102C may not be registered with the cellular network equipment 108, but may be on a same wireless local area network as the electronic device 102A, such as via the WiFi router 318. In this instance, if the call is answered by the electronic device 102C, the audio for the call may be transmitted to the electronic device 102A via the base station 315 (or the WiFi router 318), and then forwarded to the electronic device 102C via the WiFi router 318. In one or more implementations, the WiFi router 318 may be communicatively coupled, such as through a network and/or the Internet, to a server of the cellular network equipment 108, such as an evolved packet data gateway (ePDG) server, which may facilitate and/or provide WiFi calling to the electronic devices 102A,C through the WiFi router 318.

Figure 4:
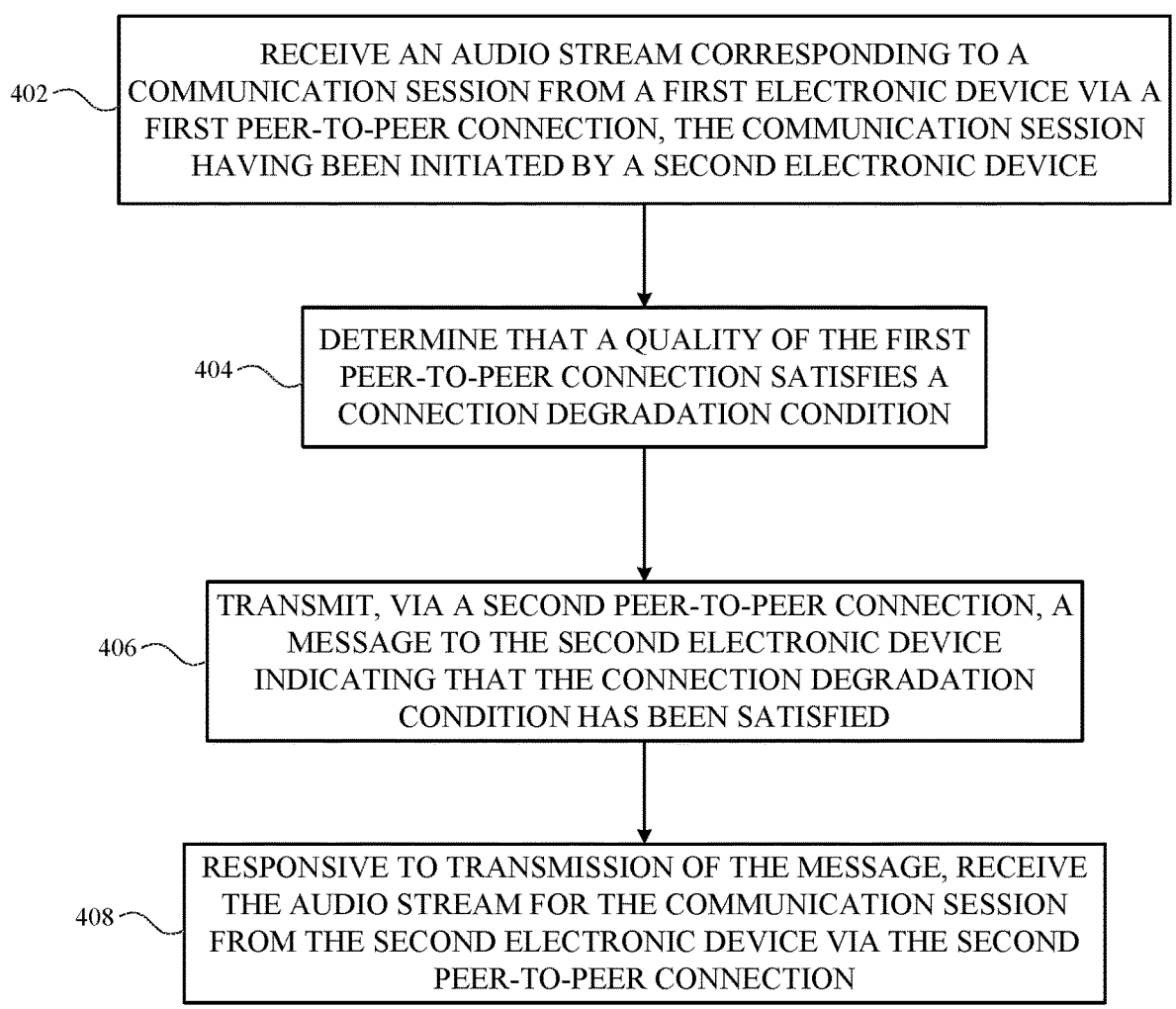
FIG. 4 illustrates a flow diagram of an example process of a wireless audio output device facilitating inter-device communication session continuity in accordance with one or more implementations.

FIG. 4 illustrates a flow diagram of an example process 400 of a wireless audio output device 104 facilitating inter-device communication session continuity in accordance with one or more implementations. For explanatory purposes, the process 400 is primarily described herein with reference to the wireless audio output device 104 of FIGS. 1-3. However, the wireless audio output device 104 is presented as an exemplary device and the operations described herein may be performed by any suitable device. Further, for explanatory purposes, the operations of the process 400 are described herein as occurring in serial, or linearly. However, multiple operations of the process 400 may occur in parallel, such that they at least partially overlap in time. In addition, the operations of the process 400 need not be performed in the order shown and/or one or more of the operations of the process 400 need not be performed and/or can be replaced by other operations.

Prior to process 400 beginning, the wireless audio output device 104 may have been previously paired with a first electronic device 102A and a second electronic device 102B, and the electronic devices 102A-B may have been previously paired with one another. In addition, the electronic device 102B may have initiated, via a peer-to-peer connection with the electronic device 102A, a communication session between the electronic device 102A and a third electronic device, such as the electronic device 102D, on behalf of the electronic device 102B. The wireless audio output device 104 may have been selected as the audio output device for the electronic device 102B. Thus, when the communication session is established by the electronic device 102A, the electronic device 102A also establishes an audio link (e.g., a synchronous connection-oriented (SCO) link, and/or an enhanced SCO (eSCO) link) over a first peer-to-peer connection with the wireless audio output device 104 and transmits the received audio for the communication session to the wireless audio output device 104.

The process 400 begins when the wireless audio output device 104 receives the audio corresponding to the communication session from the first electronic device 102A via the first peer-to-peer connection, where the communication session was initiated by the second electronic device 102B, as previously discussed (402). The wireless audio output device 104 may output the received audio, such as through a speaker so that it is perceptible to a user.

The wireless audio output device 104 may determine that the quality of the first peer-to-peer connection with the first electronic device 102A satisfies a connection degradation condition (404). For example, the wireless audio output device 104 may measure (or evaluate) one or more metrics associated with the audio link and may determine, based on the measured metrics, that the connection degradation condition is satisfied. The connection degradation condition may be a condition indicating that the peer-to-peer connection is no longer sustainable/suitable for the audio link, e.g., that the wireless audio output device 104 (and presumably the second electronic device 102B) is moving out of the range of the peer-to-peer connection or that an interference condition has arisen. The one or more metrics measured by the wireless audio output device may include any/all of a number of stalls, an audio loss percentage, an RSSI (e.g., an RSSI threshold), a number of retransmission requests, and the like. Thus, in some implementations, the quality of the first peer-to-peer connection may be independent of the quality of a cellular connection between the first electronic device 102A and a cellular base station and/or the quality of a cellular connection between the second electronic device 102B and a cellular base station.

During the communication session, the second electronic device 102B may utilize the peer-to-peer connection with the first electronic device 102A to transmit control signals and/or commands for the communication session, such as to hold the communication session, terminate the communication session, and the like. In one or more implementations, if the peer-to-peer connection between the first and second electronic devices 102A-B deteriorates before the first peer-to-peer connection between the wireless audio output device 104 and the first electronic device 102A (e.g., due to different packet sizes, transmission power levels, and the like), the electronic device 102B may relay control signals and/or commands for the communication session to the electronic device 102A over a second peer-to-peer connection with the wireless audio output device 104. The wireless audio output device 104 may forward the control signals and/or commands to the first electronic device 102A via the first peer-to-peer connection with the first electronic device 102A.

When the wireless audio output device 104 determines that the quality of the first peer-to-peer connection satisfies the connection degradation condition (404), the wireless audio output device 104 transmits, via the second peer-to-peer connection with the second electronic device 102B, a message to the second electronic device 102B that indicates that the connection degradation condition has been satisfied (406). In one or more implementations, if the wireless audio output device 104 cannot support two simultaneous peer-to-peer connections, the wireless audio output device 104 may broadcast one or more packets indicating that the connection degradation condition has been satisfied and/or the wireless audio output device 104 may relay the message to the electronic device 102B via the electronic device 102A.

The electronic device 102B may receive the message (or packet) from the wireless audio output device 104, and may responsively automatically request (e.g., without user input), via a wide area network connection (e.g., WiFi or cellular), that the cellular network equipment 108 re-route or hand-off the communication session from the first electronic device 102A to the second electronic device 102B, such as is described further above with respect to FIG. 3. The second electronic device 102B may also establish an audio link with the wireless audio output device 104 ova the second peer-to-peer connection and may forward the received audio for the communication session to the wireless audio output device 104 via the audio link.

The wireless audio output device 104 may, responsive to the transmission of the message, receive the audio for the communication session from the second electronic device 102B via the second peer-to-peer connection (408). The wireless audio output device 104 may output the start of the received audio in synchronicity with the termination of the audio received from the first electronic device 102A such that the output of the audio continues substantially uninterrupted. In some implementations, audio associated with the communication session is buffered at the wireless audio output device 104, facilitating a transition.

Figure 5:
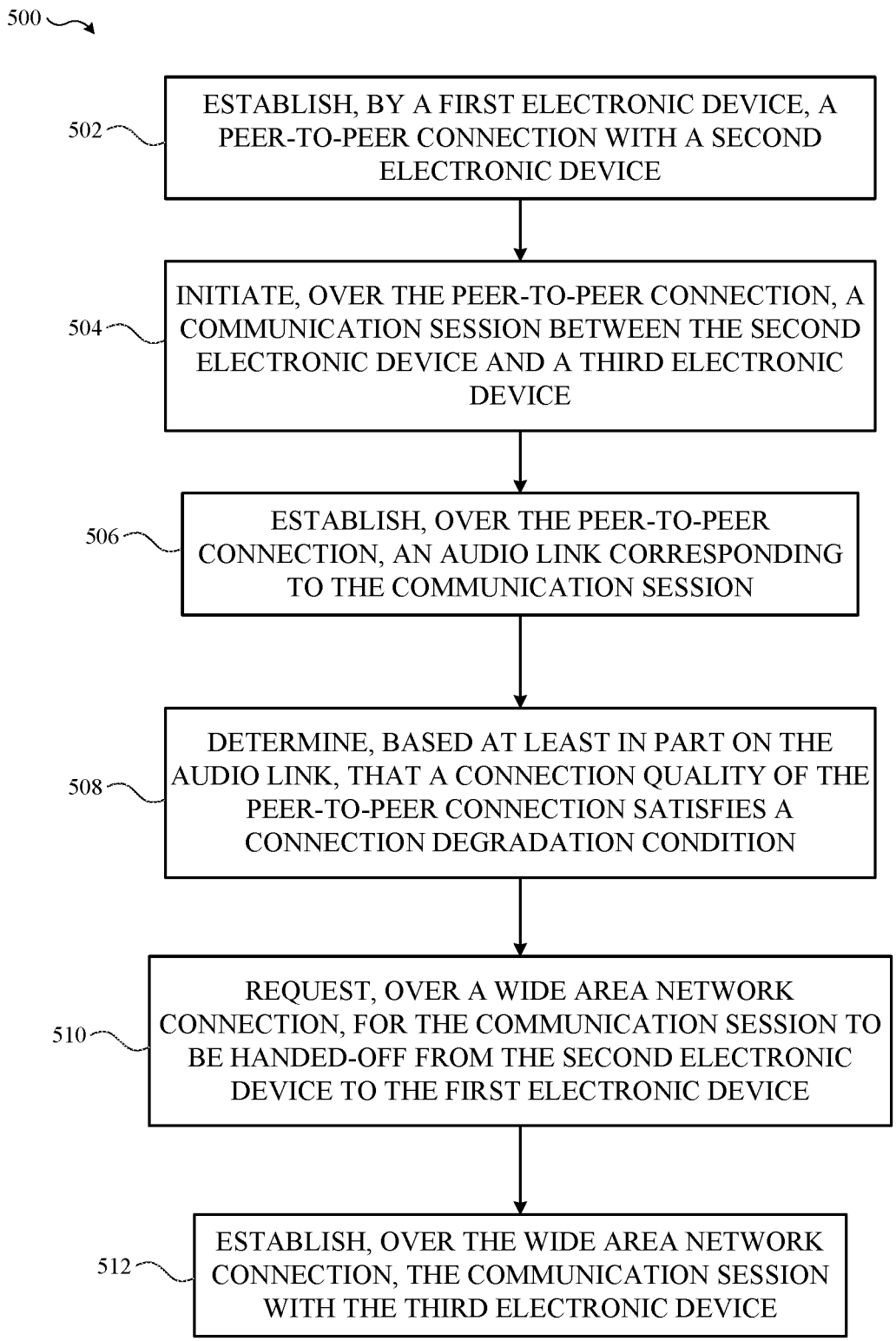
FIG. 5 illustrates a flow diagram of an example process of an electronic device performing inter-device communication session continuity in accordance with one or more implementations.

FIG. 5 illustrates a flow diagram of an example process 500 of an electronic device 102B performing inter-device communication session continuity in accordance with one or more implementations. For explanatory purposes, the process 500 is primarily described herein with reference to the electronic devices 102A-B of FIG. 1. However, the electronic devices 102A-B are presented as exemplary devices and the operations described herein may be performed by any suitable devices. Further for explanatory purposes, the operations of the process 500 are described herein as occurring in serial, or linearly. However, multiple operations of the process 500 may occur in parallel or at least partially overlap. In addition, the operations of the process 500 need not be performed in the order shown and/or one or more of the operations of the process 500 need not be performed and/or can be replaced by other operations.

The process 500 begins with an electronic device 102B establishing a peer-to-peer connection with an electronic device 102A (502). For example, the electronic devices 102A-B may have been previously paired, and the peer-to-peer connection may include, for example, an asynchronous connection-less (ACL) link. The electronic device 102B may initiate, via the peer-to-peer connection, a communication session between the electronic device 102A and an electronic device 102D (504). For example, a user may initiate a cellular call on the electronic device 102B. However, the electronic device 102B may be able to conserve battery life and/or power by requesting that the electronic device 102A receive the communication session on behalf of the electronic device 102B.

The electronic device 102B may then establish, over the peer-to-peer connection with the electronic device 102A, an audio link corresponding to the communication session (506), and the electronic device 102B may receive an audio stream for the communication session over the audio link from the electronic device 102A. The electronic device 102B may output the audio stream, such as in a speakerphone-like manner.

The electronic device 102B may determine, based at least in part on the audio link, that a connection quality of the peer-to-peer connection satisfies a connection degradation condition (508). For example, the electronic device 102B may monitor one or more metrics associated with the audio link, such as any/all of stalls, retransmission requests, audio loss percentage, RSSI (e.g, an RSSI threshold), and the like. The electronic device 102B may determine that the connection quality of the peer-to-peer connection satisfies the connection degradation condition when one or more of the monitored metrics indicates that the audio link is no longer suitable, or is becoming unsuitable, for the communication session.

Upon determining that the connection degradation condition is satisfied, the electronic device 102B may request, over a wide area network connection (e.g., WiFi or cellular), for the communication session to be handed-off from the electronic device 102A to the electronic device 102B (510). For example, the electronic device 102B may request that the cellular network equipment 108 hand-off or re-route the endpoint of the communication session from the electronic device 102A to the electronic device 102B, as is discussed further above with respect to FIG. 3. The electronic device 102B then establishes, over the wide area network connection, the communication session with the electronic device 102D (512), such as via the cellular network equipment 108, and the electronic device 102B may continue outputting the audio stream for the communication session, such as in the speakerphone-like manner.

FIG. 6 illustrates a flow diagram of an example process 600 of an electronic device 102A performing inter-device communication session continuity including wireless audio output device continuity in accordance with one or more implementations. For explanatory purposes, the process 600 is primarily described herein with reference to the electronic devices 102A,C and the wireless audio output device 104 of FIG. 1. However, the electronic devices 102A,C and the wireless audio output device 104 are presented as exemplary devices and the operations described herein may be performed by any suitable device. Further for explanatory purposes, the operations of the process 600 are described herein as occurring in serial, or linearly. However, multiple operations of the process 600 may occur in parallel or at least partially overlap. In addition, the operations of the process 600 need not be performed in the order shown and/or one or more of the operations of the process 600 need not be performed and/or can be replaced by other operations.

The process 600 begins when a first electronic device 102A requests to transfer a communication session from a second electronic device 102C to the first electronic device 102A, the communication session being with a third electronic device 102D (602). For example, the first electronic device 102A may receive user input requesting that the communication session be transferred to the first electronic device 102A, and the first electronic device 102A may responsively transmit a request to the cellular network equipment 108 to transfer or re-route the communication session from the electronic device 102C to the electronic device 102D, as is discussed further above with respect to FIG. 3.

The first electronic device 102A determines that an audio stream for the communication session is being forwarded from the second electronic device 102C to a wireless audio output device 104 (604). For example, the electronic device 102A may receive broadcast packets from the wireless audio output device 104 that indicate that the wireless audio output device 104 is being utilized by the electronic device 102C for the communication session. In one or more implementations, the electronic device 102C may receive the broadcast packets from the wireless audio output device 104 even when not connected to the wireless audio output device via a peer-to-peer connection. In one or more implementations, the first electronic device 102A may receive the broadcast packets in temporal proximity to requesting the transfer of the communication session.

The first electronic device 102A establishes the communication session with the third electronic device 102D (606), such as via the cellular network equipment 108. The first electronic device 102A connects to the wireless audio output device 104 over a peer-to-peer connection (608), and forwards the audio, e.g., one or more streams, for the communication session to the wireless audio output device 104 via the peer-to-peer connection (610), such that the wireless audio output device 104 may continue to output the audio for the communication session uninterrupted. For example, the first electronic device 102A may establish an audio link over the peer-to-peer connection with the wireless audio output device 104, and may forward the audio to the wireless audio output device 104 via the audio link.

Figure 7:
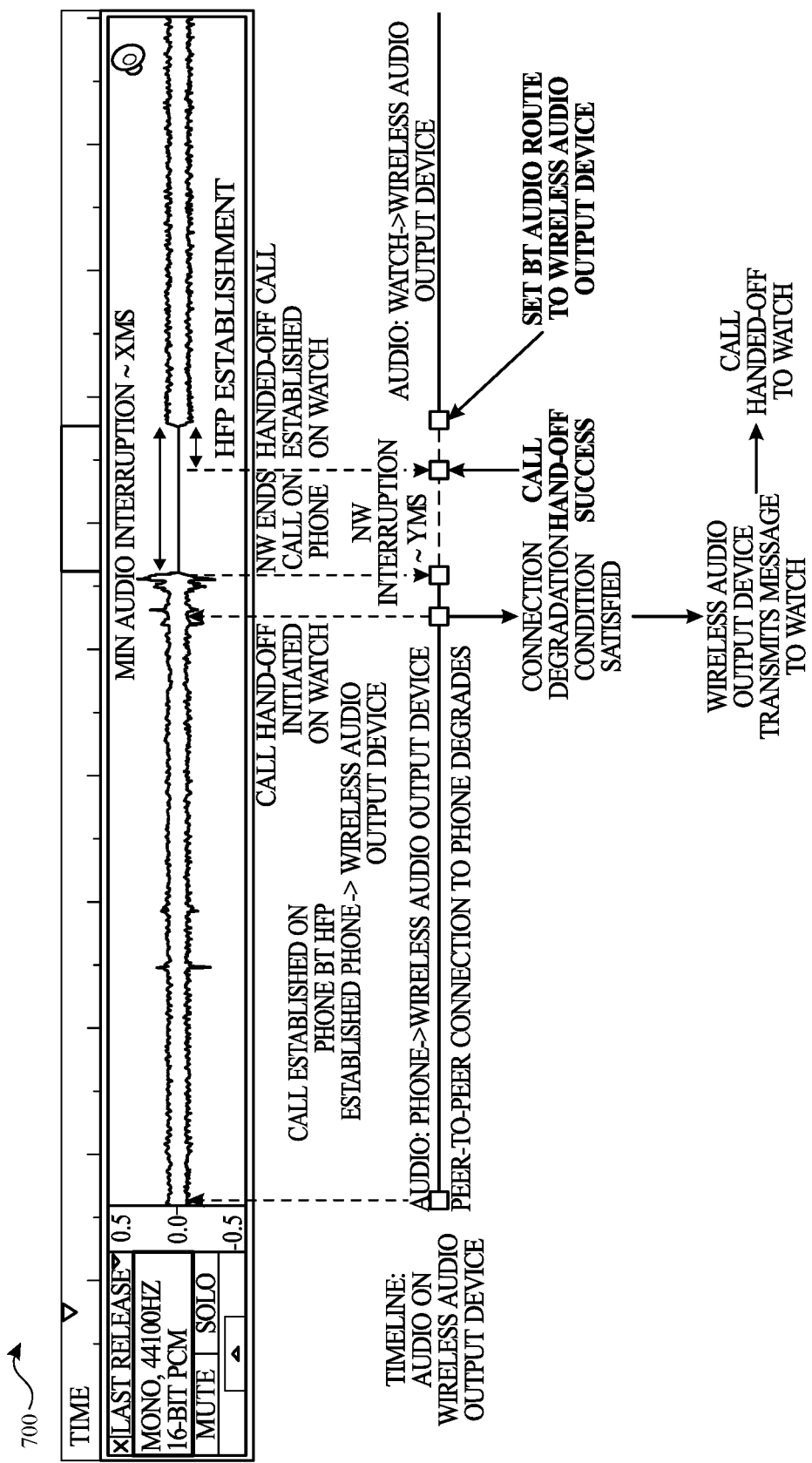
FIG. 7 illustrates an example timing diagram for inter-device communication session continuity facilitated by a wireless audio output device in accordance with one or more implementations.

FIG. 7 illustrates an example timing diagram 700 for inter-device communication session continuity facilitated by a wireless audio output device in accordance with one or more implementations. As shown in the timing diagram 700, a call is established on a first electronic device 102A, such as a phone, on behalf of a second electronic device 102B, such as a watch. In some implementations, the phone establishes a Bluetooth (BT) hands-free profile (HFP) to establish an audio link with a wireless audio output device 104, and transmits audio, e.g., an audio stream, for the call to the wireless audio output device 104 via the audio link. For example, the wireless audio output device 104 may have been selected as the audio output device for the watch (e.g., electronic device 102B).

The wireless audio output device 104 monitors the quality of the audio link with the first electronic device 102A and then determines, based on the monitored audio link, that a connection degradation condition has been satisfied. The wireless audio output device 104 automatically transmits a message to the second electronic device 102B, e.g., the watch, indicating that the connection degradation condition has been satisfied, and the watch automatically and responsively initiates a hand-off of the call from the phone to the watch, such as via the cellular network equipment 108.

The call is handed-off by the cellular network equipment 108 from the phone to the watch, and the watch automatically sets the Bluetooth audio route for the call to the wireless audio output device 104. The watch establishes an audio link with the wireless audio output device 104 and transmits the audio to the wireless audio output device 104 via the audio link. As shown in the timing diagram 700, the hand-off of the call from the phone to the watch results in no audio output interruption or a substantially reduced audio output interruption for the communication session via the wireless audio output device 104.

Figure 8:
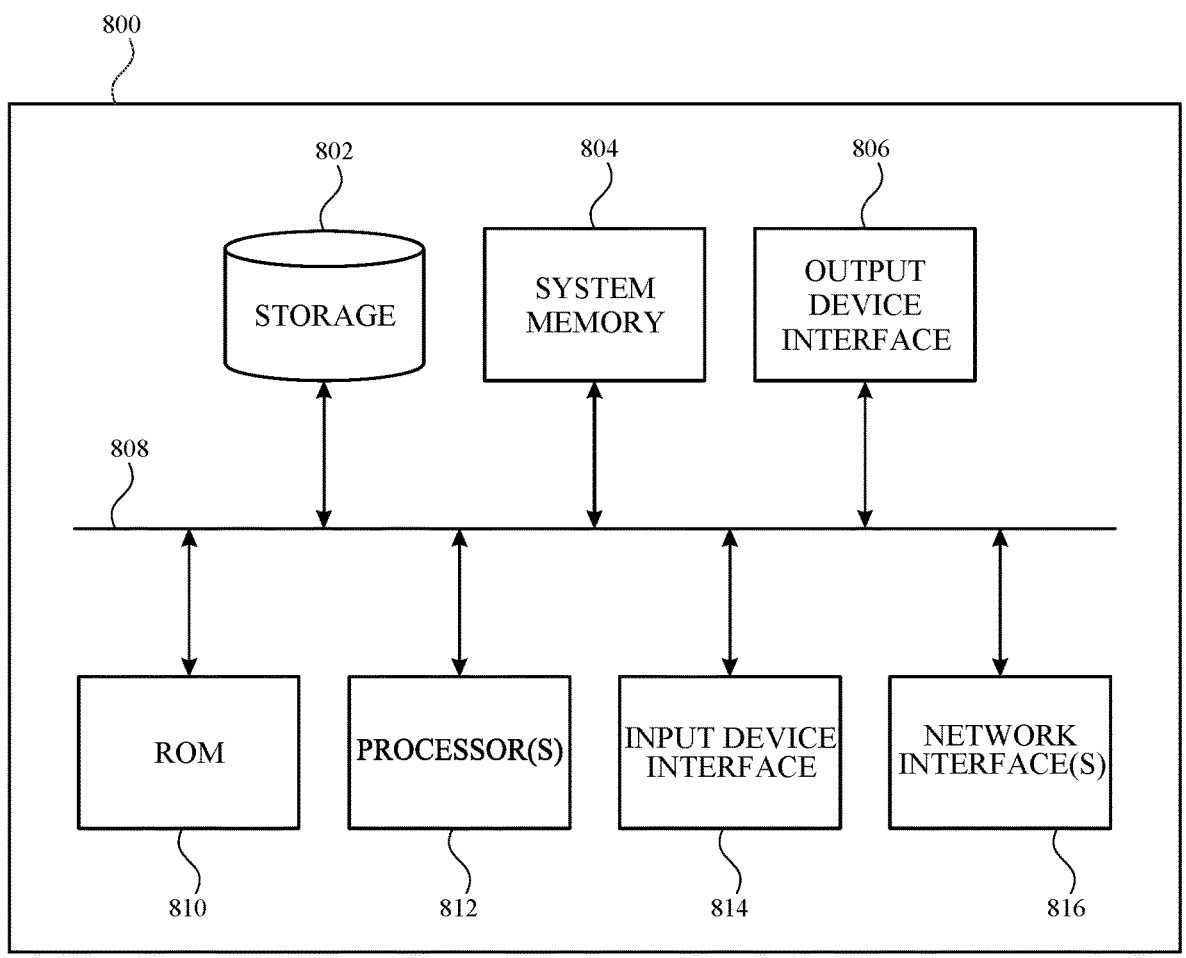
FIG. 8 conceptually illustrates an example electronic system with which aspects of the subject technology may be implemented in accordance with one or more implementations.

FIG. 8 conceptually illustrates an electronic system 800 with which one or more implementations of the subject technology may be implemented. The electronic system 800 can be, and/or can be a part of, one or more of the electronic devices 102A-D, the wireless audio output device 104, and/or the cellular network equipment 108 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

As described above, one aspect of the present technology is the gathering and use of data available from specific and legitimate sources to improve handing off communication sessions between a user's devices. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to select/suggest devices for communication session handoff in accordance with a user's preferences. Accordingly, use of such personal information data enables users to have greater control of the devices selected/suggested for communication session handoff. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of handing off communication sessions between devices, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, communication sessions can be handed-off between a user's devices based on aggregated non-personal information data or a bare minimum amount of personal information, such as the content being handled only on the user's device or other non-personal information available.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, race-track memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system comprising:
   a first electronic device configured to communicate with a second electronic device via a first wireless connection and with a third electronic device via a second wireless connection, wherein the first electronic device is further configured to:
   receive audio corresponding to a communication session from the second electronic device via the first wireless connection, the communication session having been initiated by the third electronic device;
   determine that a quality of the first wireless connection with the second electronic device satisfies a connection degradation condition;
   transmit, via the second wireless connection, a message for the third electronic device indicating that the quality of the first wireless connection with the second electronic device satisfies the connection degradation condition; and
   subsequent to transmission of the message, receive further audio corresponding to the communication session from the third electronic device via the second wireless connection.

2. The system of claim 1, further comprising the second electronic device, wherein the second electronic device is configured to:

forward the audio corresponding to the communication session to the first electronic device via the first wireless connection;
receive, from a server, an indication that the communication session will be transferred to the third electronic device; and
responsive to the received indication, stop forwarding the audio corresponding to the communication session to the first electronic device.

3. The system of claim 2, further comprising the third electronic device, wherein the third electronic device is configured to:
receive, from the first electronic device, the message indicating that the quality of the first wireless connection with the second electronic device satisfies the connection degradation condition;
transmit, to the server, a request to receive the communication session; and
forward, to the first electronic device over the second wireless connection, further audio for the communication session.

4. The system of claim 1, wherein the third electronic device is configured to initiate the communication session between the second electronic device and a fourth electronic device.

5. The system of claim 1, wherein the audio is received by the first electronic device from the second electronic device responsive to the communication session being initiated by the third electronic device.

6. The system of claim 5, wherein the third electronic device is communicatively coupled to the second electronic device via a third wireless connection and a quality of the third wireless connection when the communication session is initiated by the third electronic device is greater than a quality of the third wireless connection when the message from the first electronic device is received by the third electronic device.

7. The system of claim 6, wherein the third electronic device is further configured to control the communication session through the third wireless connection with the second electronic device.

8. The system of claim 1, wherein, the first and second wireless connections comprise Bluetooth connections.

9. The system of claim 1, wherein the communication session comprises a cellular communication session connecting a cellular base station to the second electronic device via a first cellular connection, and to the third electronic device via a second cellular connection, wherein the quality of the first wireless connection is independent of a first cellular connection quality of the first cellular connection and a second cellular connection quality of the second cellular connection.

10. The system of claim 1, wherein the first electronic device excludes a cellular communication interface for communicating with a cellular base station.

11. A first device comprising:
a memory; and
at least one processor configured to:
initiate, over a peer-to-peer connection with a second device, a communication session between the second device and a third device;
establish, over the peer-to-peer connection with the second device, an audio link corresponding to the communication session;
determine, based at least in part on the audio link, that a connection quality of the peer-to-peer connection satisfies a connection degradation condition;
request, over a wide area network connection, for the communication session with the third device to be handed-off from the second device to the first device; and
establish, over the wide area network connection, the communication session with the third device.

12. The first device of claim 11, wherein the peer-to-peer connection comprises a Bluetooth connection and the wide area network connection comprises at least one of a WiFi connection or a cellular connection.

13. The first device of claim 11, wherein the at least one processor is further configured to pair the first device with the second device prior to initiating the communication session.

14. The first device of claim 13, wherein the connection quality of the peer-to-peer connection is determined based at least in part on an audio loss percentage measured for the audio link.

15. The first device of claim 11, wherein the at least one processor is further configured to:
transmit, over the peer-to-peer connection with the second device, a control command for the communication session between the second device and the third device.

16. The first device of claim 11, wherein the at least one processor is further configured to:
establish another audio link via another peer-to-peer connection with a fourth device after requesting for the communication session with the third device to be handed-off from the second device to the first device; and
relay audio for the communication session to the fourth device via the other audio link.

17. A method comprising:
requesting, by a first electronic device, to transfer a communication session from a second electronic device to the first electronic device, the communication session being with a third electronic device;
determining that audio for the communication session is being forwarded from the second electronic device to a fourth electronic device;
establishing, by the first electronic device, the communication session with the third electronic device over a wide area network connection;
connecting, by the first electronic device, to the fourth electronic device over a peer-to-peer connection; and
forwarding the audio for the communication session to the fourth electronic device via the peer-to-peer connection.

18. The method of claim 17, further comprising:
pairing, by the first electronic device, with the fourth electronic device prior to requesting to transfer the communication session from the second electronic device to the first electronic device.

19. The method of claim 18, wherein determining that the audio for the communication session is being forwarded from the second electronic device to the fourth electronic device further comprises:
receiving, by the first electronic device, at least one broadcast packet from the fourth electronic device; and
determining, based at least in part on the received at least one broadcast packet, that the audio for the communication session is being forwarded from the second electronic device to the fourth electronic device.

20. The method of claim 19, wherein receiving, by the first electronic device, the at least one broadcast packet from the fourth electronic device further comprises receiving, by the first electronic device, the at least one broadcast packet from the fourth electronic device without being connected to the fourth electronic device.

\* \* \* \* \*